Patented Oct. 17, 1939

2,176,085

UNITED STATES PATENT OFFICE 2,176,085

MANUFACTURE OF NEW CELLULOSIC MATERIALS AND SHAPED STRUCTURES THEREFROM

Leon Lilienfeld, Vienna, Austria; Paul Abel, Vienna, Austria (Germany), executor or in case of his inability to act Emerich Hunna, Vienna, Austria (Germany), and Antonette Lilienfeld, Vienna, Austria (Germany), sole heir of Leon Lilienfeld, deceased No Drawing. Application May 11, 1936, Serial No. 79,198. In Great Britain May 17, 1935

3 Claims. (Cl. 260—226)

Cellulose ethers which are soluble in caustic alkali solution, but insoluble or only scarcely soluble in water and processes for making same and processes for converting them into artificial structures and other useful articles are described for the first time in my United States Patents Nos. 1,589,606; 1,683,831 and 1,683,682 and in my United States application Ser. No. 521,022 and corresponding British Patent No. 374,964 (these patents are concerned with the alkali-soluble alkyl derivatives of cellulose).

Further in my United States Patents Nos. 1,722,927 and 1,722,928 (these patents relate to the alkali-soluble hydroxy-alkyl derivatives of cellulose), Further in my United States Patents Nos. 1,682,292; 1,682,293 and 1,682,294 (these patents deal with the alkali-soluble hydroxy-acid ethers of cellulose), and In my United States Patent No. 2,095,524 (this patent deals with the alkali-soluble cellulose derivatives in which groups derived from halogen olefines are introduced into the cellulose molecule).

Various improvements relating to the manufacture of alkali-soluble cellulose ethers and of artificial structures and other useful articles made therefrom are described in my British specifications 459,122; 459,123; 459,712; 462,283; 462,456 and 462,713, corresponding to the disclosure of my United States applications Ser. Nos. 71,250; 71,251; 71,252; 71,253; 71,254; 71,255; 71,256; 71,257; 71,258; 71,259; 71,260; 71,261 and 71,262.

According to the working farmulae used for their preparation, inter alia according to the degree of maturing given the alkali cellulose and/or the time of the reaction and/or the time allowed the reaction mass to stand until the reaction mass is worked up and/or to the temperature at which the reaction is conducted and/or to the proportions of the alkylating or hydroxy-alkylating agents or halogen-fatty acids used for the reaction, in my aforementioned processes cellulose derivatives form which either (a) Dissolve completely, or
(b) Dissolve only incompletely, or
(c) Do not dissolve, to any substantial extent, in caustic alkali solution at room temperature.

Among the members of group (b) the proportion of the part which will dissolve in caustic alkali solution at room temperature to the part which will not dissolve in caustic alkali solution at room temperature varies in my aforementioned processes within very wide limits, for instance between 40-90 per cent. of the part that will dissolve to 60-10 per cent. of the part that will not dissolve (see for example the relative examples of my United States Patents Nos. 1,683,682 and 1,683,831) and in many instances even between 10-20 per cent. of the part that will dissolve to 90-80 per cent. of the part that does not dissolve.

The members of group (b) may therefore, by soaking them in caustic alkali solution at room temperature and filtration, straining, centrifuging or the like, be separated into their constituents which will dissolve in caustic alkali solution at room temperature and their constituents which will not dissolve in caustic alkali solution at room temperature, or they may be made to completely dissolve in caustic alkali solution according to the process laid down in my British specification No. 212,864, i. e., by contacting them with caustic alkali solution and cooling the thus obtained mixture to a temperature between plus 5° C. and minus 10° C. or lower and thereafter bringing the solution back to room temperature. (See for instance page 3, lines 62 to 71 of my British specification No. 212,864, where the making of solutions of alkali-soluble cellulose ethers by refrigeration is described for the first time.)

As a matter of course, the process of my British specification No. 212,864 can be also used for the dissolving of some of the members of group (c) in caustic alkali solution.

In many of the specifications set out above it is mentioned and in some of the specifications set out above it is illustrated by examples that viscose can be added to a solution of an alkali-soluble cellulose ether and the thus obtained mixture worked up into shaped structures or other useful articles.

The advantages of the mixtures of viscose and solutions of alkali-soluble ethers which I have hitherto produced according to these specifications over viscose consist inter alia in an appreciably lower content in impurities, for example of sulphur compounds and, accordingly, in a somewhat reduced contamination of the coagulating baths and in a greater stability.

As compared with artificial structures made from straight solutions of the alkali-soluble cellulose ethers, artificial structures produced from the aforesaid mixtures show the advantages of a higher wet tenacity and higher extensibility. On the other hand, in some instances, the artificial structures produced from those mixtures are liable to have a somewhat lower wet tenacity and extensibility than the corresponding artificial structures made from straight viscose.

The present invention is based upon the observation that it is possible to produce valuable materials suitable for the manufacture of artificial structures and other useful articles when an alkali-soluble cellulose ether, in the form of a solution or paste or in the undissolved form, is brought together with viscose provided that in the preparation of the mixture either (1) The viscose at the time of its being mixed with the cellulose ether has not attained the maturity degree $C_{24}$, preferably has not attained the maturity degree $C_{18}$ or even $C_{12}$, or (2) The viscose because of having been aged for an appropriately long time or because it has been prepared by means of a subnormal amount, for example by means of less than 20, preferably less than 15 or even 10 per cent. of carbon bisulphide calculated on the weight of the parent cellulose, has a degree of xanthation not lower, preferably higher than $C_{24}$, where in making the mixture, the proportions of the ingredients are such that the carbon bisulphide in the viscose is substantially smaller than 20 per cent., preferably substantially smaller than 15 per cent. or even 10 per cent. calculated on the sum of the weight of the cellulose contained in the viscose and the weight of the cellulose ether with which the viscose has been brought together.

The technical advance of the present process is marked (1) By the suitability of its products for being worked up into shaped structures, for instance according to the process described in my British specification 472,888 or by any other process or method (for example, by any process or method set forth in my British specification 469,007, corresponding to United States application Ser. No. 73,590 and (2) By the capability of giving satisfactory results with very small proportions of carbon bisulphide. For, since, in many cases, in modifications (1) and (2) as little as 2 to 10 per cent. of carbon bisulphide calculated on the sum which results when the weight of the cellulose contained in the parent viscose is added to the weight of the cellulose ether, are sufficient to produce very good parent materials for the manufacture of shaped structures, these proportions are distinctly lower than the proportions which, in the art, are regarded as necessary for the full xanthation of cellulose itself.

The technical advance of the present invention is further marked by the excellent properties of the artificial structures produced from the mixtures of viscose and alkali-soluble cellulose ethers prepared according to the present invention. For, in many cases, the dynamometric properties, i. e., tensile strength particularly in the wet state and extensibility of an artificial structure, such as film or artificial threads produced from a combination of cellulose xanthate and alkali-soluble cellulose ether made according to the present invention are superior to the dynamometric properties of an artificial structure of the same type prepared under the same working conditions from a straight solution in caustic alkali solution of the same alkali-soluble cellulose ether which has been used for the preparation of its mixture with viscose. In some cases, particularly the artificial structures made from the mixtures of viscose and alkali-soluble cellulose ethers prepared according to the invention display dynamometric properties which are also better than the dynamometric properties of artificial structures of the same type made from viscose.

What, however, is more important: Very often the dynamometric properties of the shaped structures, such as film or threads or the like made from the products of modification (1) or (2) of the present invention surpass the dynamometric properties of shaped structures of the same types but produced from the mixtures of alkali-soluble cellulose ethers and viscose known hitherto.

The present invention may be carried into effect in a variety of ways. Some of these methods are described in the following lines by way of examples. Since, however, the working conditions may be varied within very wide boundaries, it is not intended to limit the invention to these methods.

*Method I*

A simple or mixed cellulose ether which is soluble or at least partially soluble in caustic alkali solution and which is insoluble or only scarcely soluble in water is in the form of the crude reaction mixture resulting from the treatment of alkali cellulose with one or more etherifying agents, or In the isolated form, obtained, for example, by washing with water the crude reaction mixture resulting from the treatment of alkali cellulose with one or more etherifying agents and then, if desired, pressing and/or drying the washed product, or In the purified form, produced, for example, by dissolving the crude reaction mixture resulting from the treatment of alkali cellulose with one or more etherifying agents or the cellulose ether isolated therefrom by washing and, optionally pressing and/or drying, in caustic alkali solution, filtering the thus obtained solution and precipitating the filtrate by an acid or an acid salt or a neutral salt or any other suitable precipitating agent, dissolved (1) In a viscose which has not reached the maturity degree $C_{24}$, preferably which has not reached the maturity degree $C_{18}$ or even $C_{12}$, for example immediately after the cellulose xanthate resultant from the treatment of alkali cellulose with carbon bisulphide has been dissolved in water or caustic alkali solution, or (2) In a viscose which either because of having been aged for an appropriately long time or because it has been prepared by means of a subnormal amount, for example by means of less than 20, preferably less than 15 or even 10 per cent of carbon bisulphide calculated on the weight of the parent cellulose, has a degree of xanthation not lower, preferably higher than $C_{24}$, wherein in making the mixture the proportions of the ingredients are such that the carbon bisulphide in the viscose is substantially smaller than 20 per cent. preferably smaller than 15 per cent calculated on the sum of the weight of the cellulose contained in the viscose and the weight of the cellulose ether with which the viscose has been brought together.

The dissolving of the alkali-soluble cellulose ether in the viscose may be conducted at room temperature or, at least temporarily, at a temperature between room temperature and 0° C. or at 0° C. or, according to the process described in my British specification No. 212,864 at a temperature below 0° C., for example at minus 5 to minus 10° C. or lower.

If the cellulose ether or the crude reaction mass containing it is not dried before being incorporated with the viscose, in making the viscose, i. e., in dissolving the cellulose xanthate, i. e., the product of the treatment of alkali cellulose with carbon bisulphide, such a quantity of water and caustic alkali solution is to be used as, together with the water and caustic soda (if any) adhering to the cellulose ether or contained in the crude reaction mixture resulting from the etherifying operation, to yield a final solution containing the desired proportions of water and caustic alkali.

Method II

This method differs from Method I only in that, before being contacted with the viscose, the cellulose ether or the reaction mass containing the cellulose ether is mixed with a quantity of water or caustic alkali solution that is insufficient to produce a perfectly liquid solution of the cellulose ether.

As a matter of course, the water and the caustic alkali (if any) contained in the mixture of the cellulose ether with water or caustic alkali solution must be taken into account when the water and caustic alkali in which the cellulose xanthate is to be dissolved is calculated, so as to yield a final solution containing the desired proportions of caustic alkali and water.

Method III

This method differs from Method I in that, before being contacted with the viscose, the cellulose ether is mixed with so small a quantity of strong (say 15 to 18 per cent.) or dilute (say 5 to 12 per cent.) caustic soda solution as to yield a very thick, i. e., wet fibrous or pasty or lumpy or pap-like or jam-like mass. The introduction of the caustic soda solution may be affected either by alkalyzing the crude reaction mixture resultant from the etherifying operation or the isolated cellulose ether with an excess of the caustic alkali solution and removing the excess by pressing, centrifuging or the like or by mixing the crude reaction mixture resulting from the etherifying operation or the isolated cellulose ether with such quantity of caustic alkali solution of the desired strength as to yield a mixture containing for example, not more than 4 parts of the caustic alkali solution per 1 part of the dry cellulose ether.

The mixture of the cellulose ether with the caustic alkali solution and/or of the cellulose ether paste resulting from this mixture with the viscose may be conducted at room temperature or at a temperature between room temperature and 0° C. or at 0° C. or at a temperature below 0° C., for instance at minus 5 to minus 10° C. or lower.

As a matter of course, the water and caustic alkali contained in the cellulose ether past must be taken into account when the water and caustic alkali in which the cellulose xanthate is to be dissolved is calculated, so as to yield a final solution containing the desired proportions of caustic alkali and water.

Method IV

A simple or mixed cellulose ether which is soluble or at least partially soluble in caustic alkali solution and which is insoluble or only scarcely soluble in water is in the form of the crude reaction mixture resulting from the treatment of alkali cellulose with one or more etherifying agents, or In the isolated form obtained, for example, by washing with water the crude reaction mixture resulting from the treatment of alkali cellulose with one or more etherifying agents and then, if desired, pressing and/or drying the washed product, or In the purified form produced, for example, by dissolving the crude reaction mixture resulting from the treatment of alkali cellulose with one or more etherifying agents or the cellulose ether isolated therefrom by washing and optionally, pressing and/or drying, in caustic alkali solution, filtering the thus obtained solution and precipitating the filtrate by an acid or an acid salt of a neutral salt or any other precipitating agent dissolved in caustic alkali solution and the thus obtained solution is mixed (1) With a viscose which has not reached the maturity degree $C_{24}$, preferably which has not reached the maturity degree $C_{18}$, or even $C_{12}$, for example immediately after the cellulose xanthate resultant from the treatment of alkali cellulose with carbon bisulphide has been dissolved in water or caustic alkali solution, or (2) With a viscose which either because of having been aged for an appropriately long time or because it has been prepared by means of a subnormal amount, for example by means of less than 20, preferably less than 15 or even 10 per cent. of carbon bisulphide, calculated on the weight of the parent cellulose, has a degree of xanthation not lower, preferably higher than $C_{24}$, wherein in making the mixture, the proportions of the ingredients are such that the carbon bisulphide in the viscose is substantially smaller than 20 per cent., preferably substantially smaller than 15 per cent. calculated on the sum of the weight of the cellulose contained in the viscose and the weight of the cellulose ether with which the viscose has been brought together.

The mixing of the cellulose ether solution with the viscose may be conducted at room temperature or at a temperature between room temperature and 0° C. or at 0° C. or at a temperature below 0° C., for instance at minus 5 to minus 10° C. or lower.

Method V

A simple or mixed cellulose ether which is at a certain temperature or at certain temperatures soluble or at least partially soluble in caustic alkali solution but which at another temperature or at other temperatures is insoluble or only scarcely soluble in caustic alkali solution and which is insoluble or only scarcely soluble in water is in the form of the crude reaction mixture resulting from the treatment of alkali cellulose with one or more etherifying agents, or In the isolated form obtained, for example, by washing with water the crude reaction mixture resulting from the treatment of alkali cellulose with one or more etherifying agents and then, if desired, pressing and/or drying the washed product, or .

In the purified form produced, for example, by dissolving the crude reaction mixture resulting from the treatment of alkali cellulose with one or more etherifying agents or the cellulose ether isolated therefrom by washing and, optionally pressing and/or drying, in caustic alkali solution, filtering the thus obtained solution and precipitating the filtrate by an acid or an acid salt or a neutral salt or any other suitable precipitating agent, suspended in caustic alkali solution at a temperature at which the cellulose ether is insoluble or incompletely soluble therein, if the cellulose ether cannot be directly dissolved in caustic alkali solution at room temperature and between room temperature and 0° C. and at 0° C., but can be made soluble therein at room temperature and/or at any temperature between 0° C. and room temperature only by cooling its suspension or incomplete solution in caustic alkali solution to a temperature below 0° C., and then allowing the temperature to rise to room temperature or to a temperature between 0° C. and room temperature, the suspension may be prepared at room temperature or above room temperature or at a temperature between room temperature and 0° C. or at 0° C. Or, if the cellulose ether cannot be dissolved in caustic alkali solution at room temperature and between room temperature and 0° C., but can be made soluble therein only by cooling its suspension or incomplete solution in caustic alkali solution to 0° C. or to a temperature below 0° C., the suspension may be prepared at any temperature between room temperature and 0° C. or at 0° C., or at a temperature above room temperature. Or, if the cellulose ether cannot be dissolved in caustic alkali solution at room temperature but can be incompletely or completely dissolved therein at a temperature between room temperature and 0° C., the suspension may be prepared at room temperature or at a temperature above room temperature or at a temperature which is above the temperature at which the cellulose ether is soluble.

Now, a suspension prepared according to one of the methods set forth in the foregoing paragraph is mixed (1) With a viscose which has not reached the maturity degree $C_{24}$, preferably which has not reached the maturity degree $C_{18}$, or even $C_{12}$.

(2) Or with a viscose which either because of having been aged for an appropriately long time or because it has been prepared by means of a subnormal amount, for example by means of less than 20, preferably less than 15 or even 10 per cent. of carbon bisulphide, calculated on the weight of the parent cellulose, has a degree of xanthation not lower, preferably higher than $C_{24}$, wherein in making the mixture the proportions of the ingredients are such that the carbon bisulphide in the viscose is substantially smaller than 20 per cent., preferably substantially smaller than 15 per cent., calculated on the sum of the weight of the cellulose contained in the viscose and the weight of the cellulose ether with which the viscose has been brought together.

The mixing step can be conducted at room temperature or, at least temporarily, at a temperature between room temperature and 0° C. or at 0° C. or at a temperature below 0° C., for example at minus 5 to minus 10° C. or lower.

If in the mixing operation the right temperature is used, a solution of the suspended cellulose ether in the viscose occurs.

If the suspension of the cellulose ether does not contain the amount of water and/or caustic alkali to give with the water and caustic alkali contained in the viscose the proportions of water and caustic alkali desired in the final solution, the missing water and/or caustic alkali solution may be added to the suspension prior to or after its being contacted with the viscose.

Although, at bottom, the carrying out of the invention in practice is comparatively simple, the working condition may be varied within wide limits. It is therefore not intended to limit the invention to the following description and the examples of the practical execution of the process, i. e., to the particulars given therein as to the types of the alkali-soluble cellulose ethers (i. e., as to the nature of the radical or radicals introduced into the cellulose molecule and as to the representatives set forth by way of examples for the various types of cellulose ethers and as to the processes or methods for the production of the cellulose ethers), as to the processes or methods and temperatures of the preparation of the cellulose ether solutions, as to the quantitive composition of the cellulose ether solutions, as to the substances which optionally may be added to the combinations of cellulose ethers with viscose, as to the methods of shaping these combinations, as to the methods of the conversion of these combinations into artificial structures or other useful articles, as to the after-treatment of the artificial structures or other useful articles, etc.

It is to be understood that in the present invention in general and in the fourteen methods described above by way of examples in particular, cellulose ethers of the aforementioned types may be used which are made by any process or method whatever, for instance according to any one of the processes and methods described in my United States Patents 1,589,606; 1,683,831; 1,683,-682; 1,722,927 and 1,682,292 and my British specification 374,964, corresponding to my United States application Ser. No. 521,922 or according to any one of the processes or methods described in my British specifications 459,122; 459,123; 459,712; 462,283; 462,456 and 462,713 or according to any other process or method suitable for the preparation of such cellulose ethers as do not dissolve to any considerable extent, or do not dissolve at all, in caustic alkali solution at room temperature and at a lower temperature, for example at a temperature between room temperature and 0° C. or lower, or such cellulose ethers as do not wholly dissolve, or do not even partly dissolve, in caustic alkali solution at room temperature, but as can be partially or completely dissolved therein at room temperature by cooling their suspensions or incomplete solutions in cautic alkali solution to a temperature between room temperature and 0° C. or to 0° C. or to a temperature below 0° C., for example to minus 5° C. or to minus 10° C. or lower and then allowing the temperature to rise to 0° C. or above 0° C., for example, to a temperature between 0° C. and 20° C., or such cellulose ethers as do not dissolve or do not wholly dissolve in caustic alkali solution at room temperature or at a temperature between room temperature and 0° C. or even at 0° C., but as can be made to partially or completely dissolve therein at room temperature and/or at a temperature between room temperature and 0° C. or at 0° C. by cooling their suspensions or incomplete solutions to a temperature below 0° C., for example to minus 5° C. or minus 10° C. or lower and then allowing the temperature to rise to 0° C. or above 0° C.

In other words: In the present invention not only such alkali-soluble cellulose ethers as can be prepared by the processes and methods described in the specifications set forth in the foregoing paragraph, but also such alkali-soluble cellulose ethers may be used as are prepared by any other process or method suitable for the preparation of cellulose ethers which are at least partially soluble in caustic alkali solution or can be made soluble therein by application of low temperatures, for example by the process described in my British specification No. 212,864.

It is further to be understood that, in the present invention either simple or mixed alkali-soluble cellulose ethers can be employed. As mixed ethers the following may be named by way of example:

Cellulose derivatives containing in their molecule two different alkyl groups, cellulose derivatives containing in their molecule two different hydroxy-alkyl groups, cellulose derivatives containing in their molecule an alkyl group and a hydroxy-alkyl group, cellulose derivatives containing in their molecule two different hydroxy-acid residues, cellulose derivatives containing in their molecule an alkyl group and a hydroxy-acid residue, cellulose derivatives containing in their molecule a hydroxy-alkyl group and a hydroxy-acid residue and so on.

It must be further understood that the cellulose xanthates and/or their solutions used in the present invention may be prepared according to any process or method known in the viscose art for the preparation of cellulose xanthates and/or cellulose xanthate solutions, the process described in my British specification No. 212,865 included.

The various methods of the preparation of the alkali soluble cellulose ethers are thoroughly described in my specifications set out above and in my British specifications 469,007 and 470,746. I give the following examples without limiting myself to the details thereof. In these examples the parts are by weight:

*Examples A to F*

A. A viscose is prepared by dissolving a cellulose xanthate (made in the usual manner by treating a matured or non-matured alkali-cellulose with 40 to 60 per cent. of carbon bisulphide calculated in the weight of the parent cellulose) in such a quantity of water and caustic soda as to yield a viscose containing such a proportion of cellulose and caustic soda as together with the water and caustic soda contained in the crude reaction product resulting from the etherifying operation (which crude reaction product referred to in the following paragraph) to yield a mixture containing 4 to 6 per cent. of the dry cellulose ether contained in the crude reaction product resulting from the etherifying operation and 4 to 6 per cent. of the cellulose contained in the viscose and 6 to 9 per cent. of caustic soda.

Immediately after the dissolution of the viscose, to a quantity of the viscose containing 100 parts of cellulose a quantity of the crude reaction mixture resulting from the etherifying operation in any one of the examples of my British specifications 469,007 and 470,746, containing 40 to 60 parts of the alkali-soluble simple or mixed cellulose ether (in which crude reaction mixture the water and caustic alkali has been determined by analysis) is added, and the thus obtained mixture kneaded or stirred or agitated in a Werner-Pfleiderer xanthating machine or in a Werner-Pfleiderer kneading machine or in another stirring apparatus until a homogenous solution is obtained.

If the cellulose ether chosen will not dissolve or will only partly dissolve in the viscose at room temperature, the mixture, which may be mixed, kneaded or stirred at room temperature for 1 to 10 hours, is under stirring, kneading or otherwise agitating, cooled down to 5° C. or to 0° C. or to minus 5° C. or to minus 10° C. or lower, kept at this temperature for 20 minutes to 2 hours and then brought back to room temperature.

The resulting solution is clear and free or practically free from undissolved particles.

B. The process is conducted as in A, but with the difference that, instead of the crude reaction mixture resulting from the etherifying operation, the simple or mixed cellulose ether isolated therefrom by washing the crude reaction mixture with water and pressing the washed product is used. Before mixing it with the viscose the water-content of the washed and pressed cellulose ether is determined, so that the proportions of caustic soda and water to be present in the viscose may be calculated.

C. The process is conducted as in B, but with the difference that the isolated simple or mixed alkali-soluble cellulose ether is, if desired after having been dehydrated with alcohol and, if also desired, exhausted with ether, dried.

D. The process is conducted as in any one of the Examples A to C, but with the difference that, instead of adding the cellulose ether or the crude reaction containing it to the viscose and then mixing the two ingredients, the viscose is placed in a Werner-Pfleiderer xanthating machine or in a kneading machine or in another stirring apparatus, whereupon the crude reaction mixture containing the simple or mixed cellulose ether or the isolated cellulose ether is added and the mixing conducted as in A.

E. The process is conducted as in any one of the Examples A to D, but with the difference that the proportion of the alkali-soluble cellulose ether to the cellulose contained in the viscose is arranged in such a manner that the final solution contains 100 parts of the cellulose ether and 66 parts of the cellulose contained in the viscose, the proportions of water and caustic soda remaining the same.

F. The process is conducted as in any one of the Examples A to E, but with the difference that the proportion of the alkali-soluble cellulose ether to the cellulose contained in the viscose is arranged in such a manner that the final solution contains 66 parts of the cellulose ether and 100 parts of the cellulose contained in the viscose, the proportions of water and caustic soda remaining the same.

The solutions obtained in any one of the Examples A to F, may after having been filtered and after having aged for a shorter (for instance 12 to 36 hours) or longer (for example for 24 to 110 hours) time, converted into various artificial structures by any method known from the viscose art, for example by any one of the methods described under (1) to (11) in Example I of my British specification 469,007, (which corresponds to United States application No. 73,590).

*Examples II A to F*

The process is conducted as in any one of the Examples I A to F, but with the difference that, before being mixed with the viscose, the simple or mixed celluliose ether is, under kneading or stirring, mixed with about its weight or half its weight of a caustic soda solution of 9 to 18 per cent. strength (if the cellulose ether has not been dried, i. e., if it is used in the form of the crude reaction mixture resulting from the etherifying operation or in the isolated form obtained by washing the crude reaction mixture without subsequent drying, the water and caustic soda (if any) adhering to it must be taken into account when calculating the amount and strength of the caustic soda solution) until a uniform pasty product is obtained. As a matter of course, the proportion of water and caustic alkali solution thus incorporated with the cellulose ether must be taken into account when, before dissolving the cellulose xanthate the proportions of caustic soda and water for its solution, i. e., the viscose to be mixed with the cellulose ether are calculated. The mixing of the cellulose ether or of the crude reaction mixture resulting from the etherifying operation with the caustic soda solution may be conducted at room temperature or at a temperature between room temperature and 0° C. or at 0° C. or at a temperature below 0° C, for instance at minus 5 to minus 10° C. or lower.

Examples III A to C

A. Equal parts of a solution in caustic alkali solution of an alkali-soluble simple or mixed cellulose ether which cellulose ether and/or solution may be prepared according to any one of the examples of my British specification 470,746 (which corresponds to United States application Ser. No. 79,199), and which solution contains 6 to 9 per cent. of the cellulose ether and 6.5 to 9 per cent. of caustic soda on the one hand, and of a viscose which has been prepared by treating a non-matured alkali cellulose or an alkali cellulose that has been matured for a shorter (for example 12 to 36 hours) or a longer (for example 48 to 96 hours) time with 40 to 60 per cent. of carbon bisulphide and dissolving the thus obtained cellulose xanthate in so much caustic soda solution of appropriate strength as to yield a viscose containing 6 to 9 per cent. of cellulose and 6.5 to 9 per cent. of caustic soda on the other, are mixed, the age of the viscose being nil to 6 hours calculated from the start of the dissolving of the product of the treatment of the alkali cellulose with the carbon bisulphide.

The mixing of the cellulose ether solution with the viscose may be conducted at room temperature or at a temperature between room temperature and 0° C. or at 0° C. or at a temperature below 0° C., for instance at minus 5 to minus 10° C. or lower.

B. The process is conducted as in A, but with the difference that the ratio of the cellulose ether solution to the viscose is 100 parts of cellulose ether solution to 66 parts of viscose.

C. The process is conducted as in A, but with the difference that the ratio of the cellulose ether solution to the viscose is 66 parts of cellulose ether solution to 100 parts of viscose.

The solutions obtained in any one of the Examples A to C may after being filtered and, after having aged for a shorter (for instance 12 to 36 hours) or longer (for example for 24 to 110 hours) time, converted into various shaped structures by any method known from the viscose art, for example by any one of the methods described under (1) to (11) in Example I of my British specification 469,007, corresponding to United States application No. 73,590.

Examples IV A to C

The process is conducted as in any one of the Examples III A to C, but with the difference that, instead of a solution, a suspension of the simple or mixed cellulose ether in caustic alkali solution is used. For example, if the cellulose ether will not dissolve or will only partly dissolve in caustic alkali solution at room temperature and between room temperature and 0° C. and at 0° C., but will dissolve only at a temperature below 0° C., the suspension may be prepared at room temperature or above room temperature or at a temperature between room temperature and 0° C. or at 0° C. Or if the cellulose ether will not dissolve or will only partly dissolve in caustic alkali solution at room temperature and between room temperature and 0° C., but will dissolve only at or below 0° C., the suspension may be prepared at any temperature between room temperature and 0° C. or at a temperature above room temperature. Or, if the cellulose ether will not dissolve or will only partly dissolve in caustic alkali solution at room temperature but will partly or wholly dissolve at a temperature between room temperature and 0° C., the suspension may be prepared at room temperature or at a temperature above room temperature or at a temperature which is above the temperature at which the cellulose ether will dissolve.

As a matter of course, a cellulose ether which can be dissolved or made soluble in caustic alkali solution at any temperature aforementioned cannot be used in this example.

The mixing of the cellulose ether suspension in the caustic alkali solution with the viscose is, according to the solubility of the cellulose ether at least temporarily, conducted at a temperature low enough to effect solution thereof, i. e. between room temperature and 0° C. or at 0° C. or at a temperature below 0° C., for example at minus 5 to minus 10° C. or lower.

Example V

The process is conducted as in any one of the Examples I to IV, but with the exception that, instead of 40 to 60 per cent. only 25 to 35 per cent. of carbon bisulphide are used in the preparation of the cellulose xanthate, the age of the final solution at the time of its conversion into shaped structures not exceeding 24 to 48 hours.

Example VI

The process is conducted as in any one of the Examples I to IV, but with the exception that, instead of 40 to 60 per cent. only 10 to 20 per cent. of carbon bisulphide are used in the preparation of the cellulose xanthate, the age of the final solution at the time of its conversion into shaped structures not exceeding 6 to 20 hours.

Example VII

The process is conducted as in any one of the Examples I to IV, but with the exception that, instead of 40 to 60 per cent. 80 to 100 per cent. of carbon bisulphide are used in the preparation of the cellulose xanthate, the age of the final solution at the time of its conversion into shaped structures being 48 to 200 hours.

The foregoing examples also illustrate the invention when the viscose used is one which has attained or exceeds a maturity degree $C_{24}$, except that in every case the proportion of viscose is such that the proportion of $CS_2$ calculated on the sum of the weight of cellulose ether and the weight of the cellulose contained in the viscose is smaller than 20 per cent. as in the case for instance in Example VI (IIIB). The following table shows by way of example numerous other mixtures in which the proportion of $CS_2$ is below this 20 per cent.

| $CS_2$-proportion used in the preparation of the viscose and calculated on the weight of parent cellulose | Proportion of the cellulose ether to the cellulose contained in the viscose | Total amount of $CS_2$ calculated on the sum which results when the weight of the cellulose ether is added to the weight of the cellulose contained in the viscose |
|---|---|---|
| Per cent | | Per cent |
| 100 | 5 to 1 | 16.66 |
| 100 | 6 to 1 | 14.25 |
| 100 | 7 to 1 | 12.50 |
| 100 | 10 to 1 | 9.09 |
| 100 | 12 to 1 | 7.69 |
| 100 | 14 to 1 | 6.66 |
| 100 | 19 to 1 | 5.00 |
| 100 | 24 to 1 | 4.00 |
| 100 | 29 to 1 | 3.33 |
| 80 | 3.5 to 1 | 17.7 |
| 80 | 4 to 1 | 16.0 |
| 80 | 4.5 to 1 | 14.5 |
| 80 | 5 to 1 | 13.3 |
| 80 | 6 to 1 | 11.4 |
| 80 | 7 to 1 | 10.0 |
| 80 | 10 to 1 | 7.27 |
| 80 | 12 to 1 | 6.1 |
| 80 | 14 to 1 | 5.33 |
| 80 | 19 to 1 | 4.0 |
| 80 | 24 to 1 | 3.2 |
| 80 | 29 to 1 | 2.66 |
| 60 | 2.5 to 1 | 17.1 |
| 60 | 3 to 1 | 15.0 |
| 60 | 3.5 to 1 | 13.3 |
| 60 | 4 to 1 | 12.0 |
| 60 | 4.5 to 1 | 10.9 |
| 60 | 5 to 1 | 10.0 |
| 60 | 6 to 1 | 8.5 |
| 60 | 7 to 1 | 7.5 |
| 60 | 10 to 1 | 5.45 |
| 60 | 12 to 1 | 4.6 |
| 60 | 14 to 1 | 4.0 |
| 60 | 19 to 1 | 3.0 |
| 60 | 24 to 1 | 2.4 |
| 60 | 29 to 1 | 2.0 |
| 50 | 2 to 1 | 16.6 |
| 50 | 2.5 to 1 | 14.2 |
| 50 | 3 to 1 | 12.5 |
| 50 | 3.5 to 1 | 11.1 |
| 50 | 4 to 1 | 10.0 |
| 50 | 4.5 to 1 | 9.0 |
| 50 | 5 to 1 | 8.3 |
| 50 | 6 to 1 | 7.1 |
| 50 | 7 to 1 | 6.2 |
| 50 | 10 to 1 | 4.54 |
| 50 | 12 to 1 | 3.8 |
| 50 | 14 to 1 | 3.3 |
| 50 | 19 to 1 | 2.5 |
| 50 | 24 to 1 | 2.0 |
| 40 | 1.5 to 1 | 16.0 |
| 40 | 2 to 1 | 13.3 |
| 40 | 2.5 to 1 | 11.4 |
| 40 | 3 to 1 | 10.0 |
| 40 | 3.5 to 1 | 8.8 |
| 40 | 4 to 1 | 8.0 |
| 40 | 4.5 to 1 | 7.2 |
| 40 | 5 to 1 | 6.6 |
| 40 | 6 to 1 | 5.7 |
| 40 | 7 to 1 | 5.0 |
| 40 | 10 to 1 | 3.63 |
| 40 | 12 to 1 | 3.0 |
| 40 | 14 to 1 | 2.66 |
| 40 | 19 to 1 | 2.0 |
| 40 | 24 to 1 | 1.6 |
| 30 | 1 to 1 | 15.0 |
| 30 | 1.5 to 1 | 12.0 |
| 30 | 2 to 1 | 10.0 |
| 30 | 2.5 to 1 | 8.5 |
| 30 | 3 to 1 | 7.5 |
| 30 | 3.5 to 1 | 6.6 |
| 30 | 4 to 1 | 6.0 |
| 30 | 4.5 to 1 | 5.4 |
| 30 | 5 to 1 | 5.0 |
| 30 | 6 to 1 | 4.2 |
| 30 | 7 to 1 | 3.7 |
| 30 | 10 to 1 | 2.7 |
| 30 | 12 to 1 | 2.3 |
| 30 | 14 to 1 | 2.0 |
| 30 | 19 to 1 | 1.5 |
| 20 | 0.25 to 1 | 16.0 |
| 20 | 0.5 to 1 | 13.3 |
| 20 | 1 to 1 | 10.0 |
| 20 | 1.5 to 1 | 8.0 |
| 20 | 2 to 1 | 6.6 |
| 20 | 2.5 to 1 | 5.7 |
| 20 | 3 to 1 | 5.0 |
| 20 | 3.5 to 1 | 4.4 |
| 20 | 4 to 1 | 4.0 |
| 20 | 4.5 to 1 | 3.6 |
| 20 | 5 to 1 | 3.3 |
| 20 | 6 to 1 | 2.8 |
| 20 | 7 to 1 | 2.5 |
| 20 | 10 to 1 | 1.8 |
| 20 | 12 to 1 | 1.5 |
| 10 | 0.1 to 1 | 9.0 |
| 10 | 0.25 to 1 | 8.0 |
| 10 | 0.5 to 1 | 6.6 |
| 10 | 1 to 1 | 5.0 |
| 10 | 1.5 to 1 | 4.0 |
| 10 | 2 to 1 | 3.3 |
| 10 | 2.5 to 1 | 2.8 |
| 10 | 3 to 1 | 2.5 |
| 10 | 3.5 to 1 | 2.2 |
| 10 | 4 to 1 | 2.0 |
| 10 | 4.5 to 1 | 1.8 |
| 10 | 5 to 1 | 1.6 |
| 10 | 6 to 1 | 1.4 |
| 10 | 7 to 1 | 1.2 |

If feasible or expedient, in the foregoing examples the coagulating or precipitating baths described in my British specification 457,031, corresponding to my United States application Ser. No. 63,280 can be used in the working up of the products of the invention into shaped structures or other useful articles.

If desired, the extensibility of the shaped structures, such as threads or film or coatings or the like produced according to the present invention may be increased by treating them either in the course of their manufacture, for example after coagulating and washing or in the finished wet or dry state with suitable shrinking agents, for example, with some of the shrinking agents mentioned in my United States Patents Nos. 1,989,098; 2,001,621; 1,989,100; 1,989,101; 2,004,875, and 2,004,876.

As a guiding line with regard to the question whether or not the alkali cellulose to be etherified and/or the alkali cellulose to be xanthated should be allowed to mature before being brought together with the etherifying agent or agents and/or the carbon bisulphide may, among others, serve the desired viscosity of the final solution of the materials produced according to the present invention which is to be worked up into shaped structures, and in connection therewith the viscosity of the kind of cellulose contemplated. If it is desired to give the solution a definite viscosity, then the alkali cellulose or alkali cellulose produced from the kind of cellulose contemplated are subjected to a maturing process, if without maturing this kind of cellulose yields a higher viscosity. If, however, the solution exhibits from the first the desired grade of viscosity that is without maturing, the maturing is superfluous. Now, as the viscosities of the different kinds of cellulose on the marked (linters and wood-pulp) differ very much from one another, the question of maturing depends in most cases on the one hand on the viscosity desired of the solution intended for the manufacture of shaped structures, and on the other hand on the viscosity of the kind of cellulose being worked.

Wherever the context permits, the expressions "alkali-soluble cellulose ether", "cellulose ether which is soluble or at least partially soluble in caustic alkali solution" and "cellulose ether which is at least partially soluble in caustic alkali solution" are intended to include such simple and mixed cellulose ethers as can completely or almost completely dissolve in caustic alkali solution at room temperature or at a lower temperature, for example at a temperature between room temperature 0° C. or lower and such simple and mixed cellulose ethers as will not dissolve in caustic alkali solution at room temperature, but as can be made to dissolve (completely or substantially completely) by cooling their suspensions or incomplete solutions in caustic alkali solution to a temperature between room temperature and 0° C. or to 0° C. or to a temperature below 0° C., for example to minus 5° C. or to minus 10° C. or lower and then allowing the temperature to rise to 0° C. or above 0° C., for example to a temperature between 0° C. and 20° C. and such simple and mixed cellulose ethers as will not dissolve or will not completely dissolve in caustic alkali solution at room temperature or at a temperature between room temperature and 0° C. or even at 0° C., but as can be partially or completely dissolved by cooling their suspensions or incomplete solutions to a temperature below 0° C., for example to minus 5° C. or minus 10° C. or lower and then allowing the temperature to rise to 0° C. of above 0° C., whereby they remain dissolved.

The term "cellulose" used in the description and claims is, wherever the context permits, intended to include cellulose, its conversion and oxidation products, such as cellulose hydrate, hydrocellulose, oxycellulose, acidcellulose and the like, in short, any body of the cellulose group which has been proposed as starting material for the preparation of cellulose derivatives or cellulose compounds of any kind.

The term "alkali cellulose", wherever the context permits, means alkali cellulose prepared in the usual manner, namely by steeping cellulose in caustic alkali solution and removing the excess of the latter by pressing, or by mixing cellulose with such an amount of caustic alkali solution as is desired to be present in the final alkali cellulose.

The expression "etherification" in the specification and claims covers alkylation or aralkylation or hydroxyalkylation or production of hydroxy-acid derivatives, "ether" covers simple alkyl or aralkyl and hydroxy-alkyl or hydroxy-acid ethers and also mixed ethers, for example the mixed ethers set forth in the third paragraph of column I, page 5, "etherifying agents" covers alkylating and aralkylating and hydroxy-alkylating agents and halogen fatty aiids.

The term "viscose" used in the description and claims means a solution of cellulose xanthate in alkali solution of water.

The expression "artificial structures" or "shaped structures" used in the specification and claims is intended to include: Artificial threads, particularly artificial silk and staple fibre, artificial hair, artificial straw, film of every kind, bands and plates of every kind; plastic masses of any description; adhesives and cements; finishes, coatings and layers of every kind, particularly such as are applicable in finishing, filling and dressing of textile fabrics, sizing of yarn, thickening agents or fixing agents for pigments in textile printing and the like; paper-like surfacing, paper-sizing; in the manufacture of artificial leather or of bookcloth or of tracing cloth or of transparent paper or of transparent cloth and the like.

The term "artificial threads" denotes artificial threads and spun goods of all kinds, for instance artificial silk, artificial cotton, artificial wool, artificial hair and artificial straw of any kind.

The process of making mixed solutions by dissolving a previously undissolved cellulose xanthate or xanthate of an alkali soluble cellulose ether, in an alkaline solution of a cellulose ether, or by mixing such indissolved xanthates and alkali-soluble cellulose ethers and dissolving the mixture in a solution of a caustic alkali, are not claimed herein but are claimed in my co-pending application 73,590 filed April 9, 1936.

What I claim is:

1. In the manufacture of a parent material for making shaped structures as herein defined, wherein there are brought together an alkali-soluble cellulose ether and viscose, the improvement which consists in bringing together an alkali-soluble cellulose ether and viscose, said viscose being in such a ratio to the cellulose ether that the carbon bisulphide in the viscose is smaller in amount than 20 per cent., calculated upon the sum of the weight of the cellulose contained in the viscose plus the weight of the cellulose ether with which the viscose is brought together.

2. A process as claimed in claim 1, wherein the carbon bisulphide contained in the viscose does not exceed 10 per cent. of the sum of the weight of the cellulose contained in the viscose and the weight of the cellulose ether with which the viscose has been brought together.

3. Parent materials for making shaped structures as herein defined, which comprises a solution of an alkali-soluble cellulose ether and a cellulose xanthate dissolved in an alkali solution, the total $CS_2$ in the product being less than 20% calculated upon the sum of the weight of the said cellulose ether plus the weight of cellulose in the said viscose.

LEON LILIENFELD.